US009639258B2

(12) United States Patent
Storrusten (10) Patent No.: US 9,639,258 B2
(45) Date of Patent: *May 2, 2017

(54) MANIPULATION OF LIST ON A MULTI-TOUCH DISPLAY

(71) Applicant: Microsoft Technology Licensing, LLC, Redmond, WA (US)

(72) Inventor: Dane Trevor Storrusten, North Hollywood, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 329 days.

This patent is subject to a terminal disclaimer.

(21) Appl. No.: 14/089,656

(22) Filed: Nov. 25, 2013

(65) Prior Publication Data

US 2014/0089854 A1 Mar. 27, 2014

Related U.S. Application Data

(63) Continuation of application No. 12/327,714, filed on Dec. 3, 2008, now Pat. No. 8,610,673.

(51) Int. Cl.
*G06F 3/048* (2013.01)
*G06F 3/0485* (2013.01)
*G06F 3/042* (2006.01)
*G06F 3/0482* (2013.01)
*G06F 3/0488* (2013.01)

(52) U.S. Cl.
CPC .......... *G06F 3/0485* (2013.01); *G06F 3/0425* (2013.01); *G06F 3/0482* (2013.01); *G06F 3/0488* (2013.01); *G06F 3/04883* (2013.01); *G06F 2203/04808* (2013.01)

(58) Field of Classification Search
CPC combination set(s) only.
See application file for complete search history.

(56) References Cited

U.S. PATENT DOCUMENTS 5,175,534 A 12/1992 Thatcher
5,491,781 A 2/1996 Gasperina
(Continued)

OTHER PUBLICATIONS

"Apple—MacBook Air—Features", Apple Inc., http://www.apple.com/macbookair/features.html, Accessed: Sep. 16, 2008, 2 pages.
(Continued)

*Primary Examiner* — Hien Duong
(74) *Attorney, Agent, or Firm* — Alleman Hall Creasman & Tuttle LLP (57) ABSTRACT

Embodiments related to the manipulation of lists via a multi-touch display are disclosed. One disclosed embodiment comprises a computing device having a touch-sensitive display, a processor, and memory. The memory comprises code executable by the processor to display a scrollable list of items on the touch-sensitive display, to detect a first touch gesture over the scrollable list of items on the touch-sensitive display, and, in response, to scroll the scrollable list of items on the touch-sensitive display. The memory further comprises code executable by the processor to detect a second, multi-touch gesture over the scrollable list of items on the touch-sensitive display, and in response to adjust a displayed range of the scrollable list of items.

19 Claims, 5 Drawing Sheets

(56) References Cited

U.S. PATENT DOCUMENTS

| | | | |
|---|---|---|---|
| 5,894,556 | A | 4/1999 | Grimm et al. |
| 6,204,846 | B1 | 3/2001 | Little et al. |
| 6,922,816 | B1 | 7/2005 | Amin et al. |
| 7,075,513 | B2 | 7/2006 | Silfverberg et al. |
| 7,133,368 | B2 | 11/2006 | Zhang et al. |
| 7,194,002 | B2 | 3/2007 | Zhang et al. |
| 7,418,454 | B2 | 8/2008 | Chen et al. |
| 7,705,830 | B2 | 4/2010 | Westerman et al. |
| 7,765,491 | B1 | 7/2010 | Cotterill |
| 8,352,877 | B2 | 1/2013 | Beatty et al. |
| 2006/0026536 | A1 | 2/2006 | Hotelling et al. |
| 2006/0066588 | A1* | 3/2006 | Lyon .............. G06F 3/0488 345/173 |
| 2006/0284852 | A1 | 12/2006 | Hofmeister et al. |
| 2007/0081726 | A1 | 4/2007 | Westerman et al. |
| 2007/0136778 | A1* | 6/2007 | Birger ............ G11B 19/025 725/117 |
| 2007/0146337 | A1* | 6/2007 | Ording ............ G06F 3/0485 345/173 |
| 2007/0152984 | A1* | 7/2007 | Ording ........... G06F 3/04845 345/173 |
| 2007/0188473 | A1* | 8/2007 | Anwar ............ G06F 3/0481 345/173 |
| 2007/0252821 | A1 | 11/2007 | Hollemans et al. |
| 2007/0279394 | A1 | 12/2007 | Lampell et al. |
| 2007/0280255 | A1 | 12/2007 | Tsang et al. |
| 2008/0133767 | A1 | 6/2008 | Birrer et al. |
| 2008/0158191 | A1 | 7/2008 | Yang et al. |
| 2008/0165141 | A1 | 7/2008 | Christie |
| 2008/0168384 | A1* | 7/2008 | Platzer ........... G06F 3/04845 715/784 |
| 2008/0168402 | A1* | 7/2008 | Blumenberg ..... G06F 3/04845 715/863 |
| 2008/0168405 | A1* | 7/2008 | Tolmasky ........ G06F 1/1626 715/863 |
| 2008/0168478 | A1* | 7/2008 | Platzer ........... G06F 3/04845 719/328 |
| 2009/0125824 | A1* | 5/2009 | Andrews ......... G06F 3/03547 715/764 |
| 2009/0153478 | A1 | 6/2009 | Kerr et al. |
| 2009/0179867 | A1* | 7/2009 | Shim .............. G06F 3/04883 345/173 |
| 2009/0201261 | A1* | 8/2009 | Day ............... G06F 3/04883 345/173 |
| 2009/0228828 | A1 | 9/2009 | Beatty et al. |
| 2009/0278806 | A1* | 11/2009 | Duarte ............ G06F 3/0416 345/173 |
| 2009/0322676 | A1 | 12/2009 | Kerr et al. |
| 2009/0327974 | A1* | 12/2009 | Abanami ........ G06F 3/04883 715/863 |
| 2010/0031202 | A1* | 2/2010 | Morris ........... G06F 3/04883 715/863 |
| 2010/0050133 | A1* | 2/2010 | Nishihara ........ G06F 3/017 715/863 |
| 2010/0070913 | A1* | 3/2010 | Murrett .......... G06F 3/017 715/786 |
| 2010/0138776 | A1* | 6/2010 | Korhonen ....... G06F 3/04883 715/786 |

OTHER PUBLICATIONS

Baldus, Benjamin et al., "Enabling Cursor Control Using on Pinch Gesture Recognition", http://www.cs.iastate.edu/~alex/classes/2007_Fall_401/proposals/05_GestureRecognition.pdf, Oct. 5, 2007, 16 pages.

"iPhone: Using the Multi-touch Display", Apple Inc., http://support.apple.com/kb/HT1636, Accessed: Sep. 16, 2008, 2 pages.

Carter, R. et al., "Measuring Bottleneck Link Speed in Packet-Switched Networks," Performance Evaluation, vol. 27-28, Oct. 1996, 24 pages.

Ribeiro, V. et al., "Multifractal Cross-Traffic Estimation," Proceedings of ITC Specialist Seminar on IP Traffic Measurement, Modeling and Management, Sep. 2000, Monterey, California, 10 pages.

"V.92: Enhancements to Recommendation V.90," International Telecommunication Union Website, Available Online at www.itu.int/rec/T-REC-V.92/en, Nov. 2000, as Retrieved Mar. 9, 2009, 1 page.

Melander, B. et al., "A New End-to-End Probing and Analysis Method for Estimating Bandwidth Bottlenecks," IEEE 2000 Global Telecommunications Conference (GLOBECOM '00), Nov. 27, 2000, San Francisco, California, 6 pages.

Lai, K. et al., "Nettimer: A Tool for Measuring Bottleneck Link Bandwidth," Proceedings of the 3rd Conference on USENIX Symposium on Internet Technologies and Systems (USITS'01 ), vol. 3, Mar. 26, 2001, San Francisco, California, 13 pages.

Jain, M. et al., "Pathload: a measurement tool for end-to-end available bandwidth," Proceedings of the 2002 Passive and Active Measurement Conference (PAM '02), Mar. 24, 2002, Ft. Collins, Colorado, 12 pages.

Ng, T. et al., "Measurement-Based Optimization Techniques for Bandwidth-Demanding Peer-to-Peer Systems," Proceedings of the Twenty-Second Annual Joint Conference of the IEEE Computer and Communications IEEE Societies (INFOCOM 2003), Mar. 30, 2003, San Francisco, California, 11 pages.

Ribeiro, V. et al., "pathChirp: Efficient Available Bandwidth Estimation for Network Paths," Proceedings of the 2003 Passive and Active Measurement Conference (PAM '03), Apr. 2003, La Jolla, California, 11 pages.

Hu, N. et al., "Evaluation and Characterization of Available Bandwidth Probing Techniques," IEEE Journal on Selected Areas in Communications, vol. 21, No. 6, Aug. 2003, 16 pages.

Lakshminarayanan, K. et al., "Some Findings on the Network Performance of Broadband Hosts," Proceedings of the 3rd ACM SIGCOMM Conference on Internet Measurement (IMC '03), Oct. 27, 2003, Miami Beach, Florida, 6 pages.

Strauss, J. et al., "A Measurement Study of Available Bandwidth Estimation Tools," Proceedings of the 3rd ACM SIGCOMM Conference on Internet Measurement (IMC '03), Oct. 27, 2003, Miami Beach, Florida, 6 pages.

Bozdog, A. et al., "SelectCast—A Scalable and Self-Repairing Multicast Overlay Routing Facility," Proceedings of the 2003 ACM Workshop on Survivable and Self-Regenerative Systems: in Association with 10th ACM Conference on Computer and Communications Security (SSRS '03), Oct. 31, 2003, Washington, D.C., 10 pages.

Lakshminarayanan, K. et al., "Bandwidth Estimation in Broadband Access Networks," Proceedings of the 4th ACM SIGCOMM Conference on Internet Measurement (IMC '04), Oct. 25, 2004, Taormina, Sicily, 8 pages.

Dovrolis, C. et al., "Packet-Dispersion Techniques and a Capacity-Estimation Methodology," IEEE/ACM Transactions on Networking, vol. 12, No. 6, Dec. 2004, 15 pages.

Shriram, A. et al., "Comparison of Public End-to-End Bandwidth Estimation Tools on High-Speed Links," Proceedings of the 6th International Conference on Passive and Active Network Measurement (PAM'05), Mar. 31, 2005, 14 pages.

Eriksen, M., "Trickle: A Userland Bandwidth Shaper for Unix-like Systems," Proceedings of the Annual Conference on USENIX Annual Technical Conference (ATEC '05), Apr. 10, 2005, Anaheim, California, 10 pages.

Hu, N. et al., "Exploiting Internet Route Sharing for Large Scale Available Bandwidth Estimation," Proceedings of the 5th ACM SIGCOMM Conference on Internet Measurement (IMC '05), Oct. 19, 2005, Berkeley, California, 6 pages.

Peterson, L. et al., "Using PlanetLab for Network Research: Myths, Realities, and Best Practices," ACM SIGOPS Operating Systems Review, vol. 40, No. 1, Jan. 1, 2006, 12 pages.

Biskupski, B. et al., "High-Bandwidth Mesh-based Overlay Multicast in Heterogeneous Environments," Proceedings of the 2nd International Workshop on Advanced Architectures and Algorithms for Internet Delivery and Applications (AAA-IDEA '06), Oct. 10, 2006, Pisa, Italy, 7 pages.

(56) References Cited

OTHER PUBLICATIONS

Pang, J. et al., "Scaling Peer-to-Peer Games in Low-Bandwidth Environments," Proceedings of the 6th International Workshop on Peer-to-Peer Systems (IPTPS 2007), Feb. 26, 2007, Bellevue, Washington, 6 pages.

"Speed Matters: A Report on Internet Speeds in All 50 States," Communications Workers of America Report, Jul. 2007, 59 pages.

Ghoshal, J. et al., "Variable Neighbor Selection in Live Peer-to-Peer Multimedia Streaming Networks," UNL Department of Computer Science and Engineering, Technical Report TR-UNL-CSE-2007-021, Sep. 2007, 6 pages.

Jin, X. et al., "On Maximizing Tree Bandwidth for Topology-Aware Peer-to-Peer Streaming," IEEE Transactions on Multimedia, vol. 9, No. 8, Dec. 2007, 13 pages.

Li, W. et al., "UTAPS: An Underlying Topology-aware Peer Selection Algorithm in BitTorrent," Proceedings of the 22nd International Conference on Advanced Information Networking and Applications (AINA '08), Mar. 25, 2008, Okinawa, Japan, 7 pages.

Vishwanath, K. et al., "Evaluation Distributed Systems: Does Background Traffic Matter?," Proceedings of the USENIX 2008 Annual Technical Conference (ATC'08), Jun. 22, 2008, Boston, Massachusetts, 14 pages.

"Average U.S. Upload Speed: 435kbps: CWA Union test site suggests things could be much better . . . ," Broadband DSL Reports Website, Available Online at http://www.dslreports.com/shownews/average-us-upload-speed-435kbps-96949, Aug. 13, 2008, as Retrieved Oct. 20, 2010, 22 pages.

Bharambe, A. et al., "Donnybrook: Enabling Large-Scale, High-Speed, Peer-to-Peer Games," Proceedings of the ACM SIGCOMM 2008 Conference on Data Communication (SIGCOMM '08), Aug. 17, 2008, Seattle, Washington, 12 pages.

Dischinger, M. et al., "SatelliteLab: Adding Heterogeneity to Planetary-Scale Network Testbeds," Proceedings of the ACM SIGCOMM 2008 Conference on Data Communication (SIGCOMM '08), Aug. 17, 2008, Seattle, Washington, 12 pages.

"Speed Test Statistics" Broadband DSL Reports Website, Retrieved Online at http://www.dslreports.com/speedtest/results/isp, as Retrieved Jan. 12, 2009, 8 pages.

Douceur, J. et al., "ThunderDome: Discovering Upload Constraints Using Decentralized Bandwidth Tournaments," Proceedings of the 5th International Conference on Emerging Networking Experiments and Technologies (CoNEXT 09), Dec. 1, 2009, Rome, Italy, 12 pages.

Douceur, J. et al., "Collaborative Measurements of Upload Speeds in P2P Systems," Proceedings of the 29th Conference on Information Communications (INFOCOM'10), Mar. 14, 2010, San Diego, California, 9 pages.

\* cited by examiner

MANIPULATION OF LIST ON A MULTI-TOUCH DISPLAY

CROSS REFERENCE TO RELATED APPLICATIONS

This application is a continuation of U.S. patent application Ser. No. 12/327,714, filed on Dec. 3, 2008, and titled "MANIPULATION OF LIST ON A MULTI-TOUCH DISPLAY" the entire disclosure of which is incorporated by reference.

BACKGROUND

Computing devices may present lists of items to a user via a scrollable list on a graphical user interface. For lists containing large numbers of items, various methods have been used to allow users to scroll through such lists quickly. For example, scroll bars located adjacent sides of a displayed list may be provided to allow a user to quickly navigate through a large list of items presented on the display by dragging a "thumb" icon along the scroll bar.

Scroll bars and similar controls were developed largely around features associated with the mouse input paradigm. Recent improvements in touch-sensitive display technology have resulted in more widespread use of multi-touch displays that are capable of receiving input from multiple temporally overlapping touch inputs. Along with the development of touch-sensitive displays have come user interfaces that attempt to allow displayed content to be manipulated via natural, intuitive movements associated with the content. Because scroll bars are spatially separated from the content being scrolled, the use of scroll bars in a touch-sensitive display may be less connected to the content being manipulated than other touch inputs supported by a multi-touch graphical user interface.

However, the omission of a scroll bar from a graphical user interface may lead to shortcomings with the use of touch inputs to manipulate the interface. For example, in a user interface that supports scrolling via "dragging" gestures made over list items, scrolling through long lists may be cumbersome and time-consuming without a scroll bar thumb.

SUMMARY

Accordingly, various embodiments related to the manipulation of lists via a multi-touch display are provided. For example, in one disclosed embodiment, a computing device comprises a touch-sensitive display, a processor, and memory. The memory comprises code executable by the processor to display a scrollable list of items on the touch-sensitive display, to detect a first touch gesture over the scrollable list of items on the touch-sensitive display, and, in response, to scroll the scrollable list of items on the touch-sensitive display. The memory further comprises code executable by the processor to detect a second, multi-touch gesture over the scrollable list of items on the touch-sensitive display, and in response to adjust a displayed range of the scrollable list of items.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
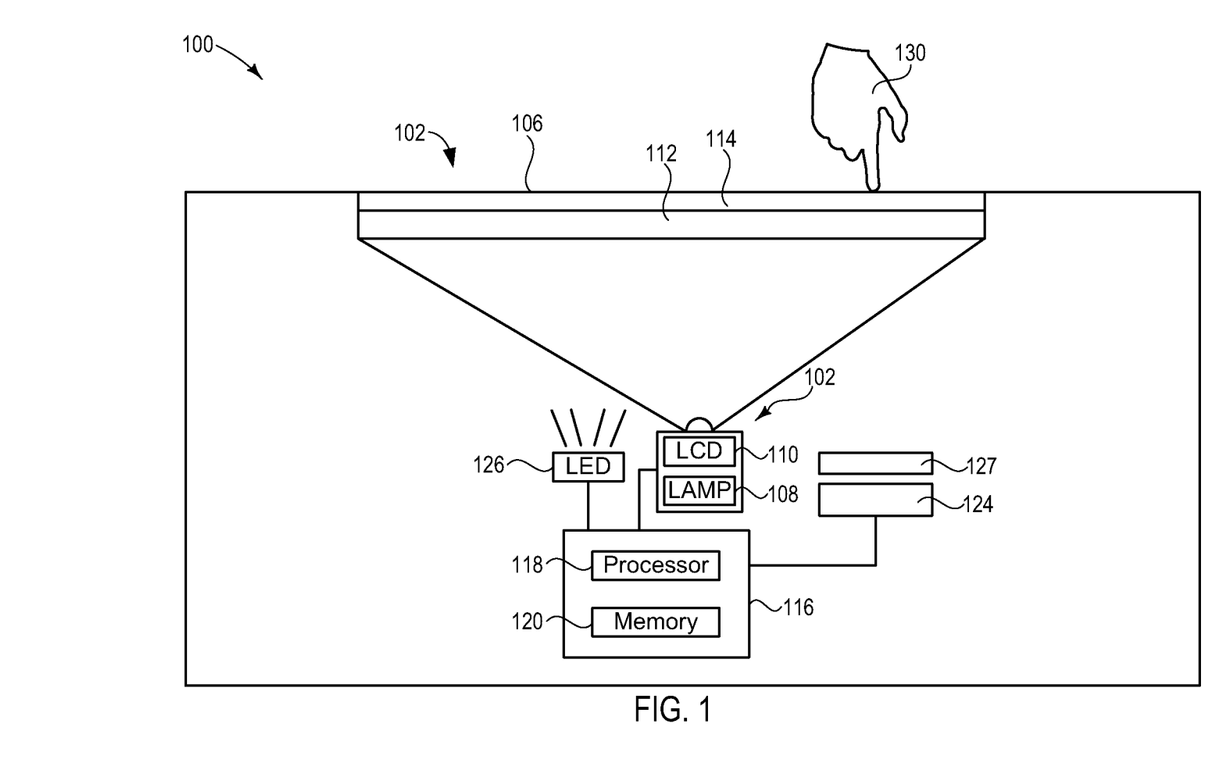
FIG. 1 shows an embodiment of a computing device including a touch-sensitive display.

Prior to discussing the manipulation of a list of items displayed on a multi-touch display, an embodiment of an example multi-touch display device is described. FIG. 1 shows a schematic depiction of an embodiment a computing device 100 comprising a touch-sensitive display 102. The touch-sensitive display 102 comprises a projection display system having an image source 104, and a display screen 106 onto which images are projected. While shown in the context of a projection display system, it will be appreciated that the embodiments described herein may also be implemented with other suitable display systems, including but not limited to LCD panel systems.

The image source 104 includes a light source 108 such as a lamp (depicted), an LED array, or other suitable light source. The image source 104 also includes an image-producing element 110 such as the depicted LCD (liquid crystal display), an LCOS (liquid crystal on silicon) display, a DLP (digital light processing) display, or any other suitable image-producing element.

The display screen 106 includes a clear, transparent portion 112, such as sheet of glass, and a diffuser screen layer 114 disposed on top of the clear, transparent portion 112. As depicted, the diffuser screen layer 114 acts as a touch surface. In other embodiments, an additional transparent layer (not shown) may be disposed over diffuser screen layer 114 as a touch surface to provide a smooth look and feel to the display surface. Further, in embodiments that utilize a LCD panel rather than a projection image source to display images on display screen 106, the diffuser screen layer 114 may be omitted.

Continuing with FIG. 1, the touch-sensitive display 102 further includes an electronic controller 116 comprising memory 118 and a processor 120. It will be understood that memory 118 may comprise code stored thereon that is executable by the processor 120 to control the various parts of computing device 100 to effect the methods described herein.

To sense objects placed on display screen 106, the touch-sensitive display 102 includes an image sensor 124 configured to capture an image of the entire backside of display screen 106, and to provide the image to electronic controller 116 for the detection of objects appearing in the image. The diffuser screen layer 114 helps to avoid the imaging of objects that are not in contact with or positioned within a few millimeters of display screen 106. Because objects that are close to but not touching the display screen 106 may be detected by image sensor 124, it will be understood that the term "touch" as used herein also may comprise near-touch inputs.

The image sensor 124 may include any suitable image sensing mechanism. Examples of suitable image sensing mechanisms include but are not limited to CCD and CMOS image sensors. Further, the image sensing mechanisms may capture images of display screen 106 at a sufficient frequency to detect motion of an object across display screen 106. While the embodiment of FIG. 1 shows one image sensor, it will be appreciated that more than one image sensor may be used to capture images of display screen 106.

The image sensor 124 may be configured to detect light of any suitable wavelength, including but not limited to infrared and visible wavelengths. To assist in detecting objects placed on display screen 106, the image sensor 124 may further include an illuminant 126 such as one or more light emitting diodes (LEDs) configured to produce infrared or visible light to illuminate a backside of display screen 106. Light from illuminant 126 may be reflected by objects placed on display screen 106 and then detected by image sensor 124. Further, an infrared band pass filter 127 may be utilized to pass light of the frequency emitted by the illuminant 126 but prevent light at frequencies outside of the band pass frequencies from reaching the image sensor 124, thereby reducing the amount of ambient light that reaches the image sensor 124.

While described herein in the context of an optical touch-sensitive system, the embodiments described herein also may be used with any other suitable type of touch-sensitive input system and with any suitable type of computing device. Examples of other such systems include, but are not limited to, capacitive and resistive touch-sensitive inputs. Further, while depicted schematically as a single device that incorporates the various components described above into a single unit, it will be understood that the touch-sensitive display 102 also may comprise more than one discrete physical parts or units connected as a system by cables, wireless connections, network connections, etc. It will be understood that the term "computing device" may include any device that electronically executes one or more programs, such as a user interface program. Such devices may include, but are not limited to, personal computers, laptop computers, servers, portable media players, hand-held devices, cellular phones, and microprocessor-based programmable consumer electronic and/or appliances.

FIG. 1 also depicts a hand 130 with a finger placed on display screen 106. Light from the illuminant 126 reflected by the finger may be detected by image sensor 124, thereby allowing the touch of the finger to be detected on the screen. While shown in the context of a finger, it will be understood that any other suitable manipulator or manipulators (e.g. one or more styluses, paint brushes, etc.) may be used to interact with computing device 100.

Figure 2:
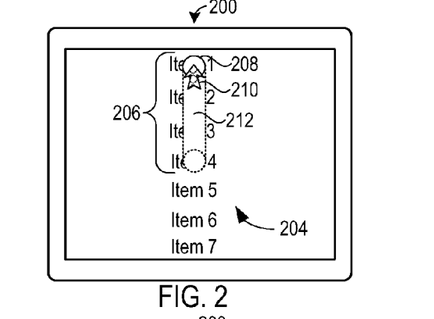
FIG. 2 illustrates an embodiment of a first touch gesture being performed over an embodiment of a list displayed on a touch-sensitive display.

FIG. 2 illustrates an embodiment of a graphical user interface window 200 that may be displayed on the touch-sensitive display 102. Graphical user interface window 200 may be used to display a scrollable list of items 204 in the graphical user interface window 200. FIG. 2 also illustrates an embodiment of a first touch gesture 206 made over the scrollable list of items 204. Where the scrollable list of items is displayed in a graphical user interface window, as illustrated in FIG. 2, a touch gesture performed anywhere over the window may be considered to be over the list of items, and therefore be effective to manipulate the list of items. While described in the context of a graphical user interface application window, it will be understood that a list as disclosed herein may be displayed in any other suitable environment on a graphical user interface, including but not limited to a desktop region, etc.

Figure 6:
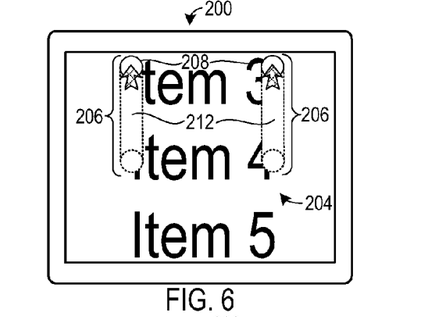
FIG. 6 illustrates an embodiment of a first touch gesture of FIG. 1 being performed over the list of FIG. 5.
Figure 7:
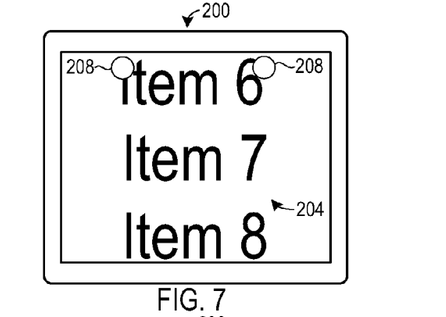
FIG. 7 illustrates a movement of the re-scaled list of FIG. 5 in response to the input illustrated in FIG. 6.

To initiate the first touch gesture displayed in FIG. 2, a user may touch the display with one or more fingers (one is illustrated schematically at 208 in FIG. 2) or other manipulators, and then move the fingers or manipulators across the touch-sensitive display, as indicated by arrow 210, along a path 212 within a predetermined range of directions. Each touch may be referred to herein as a "touch input". While only a single touch input is depicted, it will be understood that two or more touch inputs may be performed to execute the first touch gesture. A first touch gesture comprising two touch inputs is illustrated in FIGS. 6 and 7, discussed below.

Figure 3:
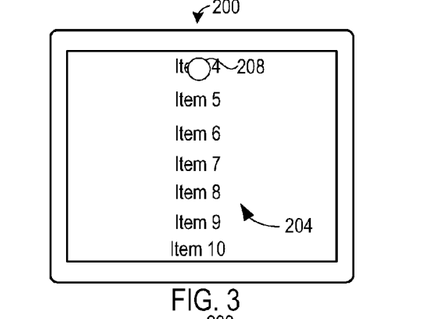
FIG. 3 illustrates a movement of the list of FIG. 2 in response to the input illustrated in FIG. 2.

In response to the first touch gesture 206, the scrollable list of items 204 in the graphical user interface window 200 is scrolled, as illustrated in FIG. 3, along a same direction as the first touch gesture (or a component of the direction of the first touch gesture). In some embodiments, a rate of scrolling may have a 1:1 relationship to the rate of the first touch gesture. For example, if the user slides a finger upwardly a distance 6 cm, the list will move the same distance at the same rate of speed. It will be understood that the term "scroll rate" as used herein represents a distance that a displayed list item moves relative to a distance that a finger or other manipulator (or group of fingers or other manipulators) moves on the display.

Scrolling via the illustrated first gesture may allow a user to accurately and precisely scroll to specific items in the list of items 204. However, for long lists, scrolling between distant items in the list may be cumbersome using the illustrated first gesture. Further, in some situations, a user may wish to zoom in on a portion of a list, for example, to more easily view text and/or images in a list item. Therefore, additional figures herein show examples of other touch gestures that may be used to adjust a zoom and/or scrolling rate of a list on a graphical user interface.

Figure 4:
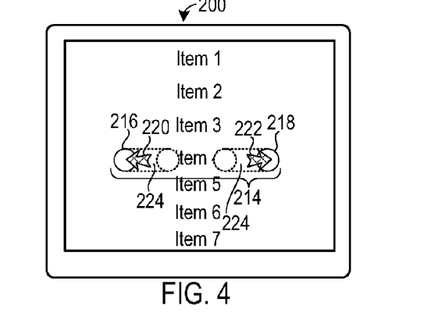
FIG. 4 illustrates an embodiment of a second, multi-touch gesture being performed over the list of FIG. 2.
Figure 5:
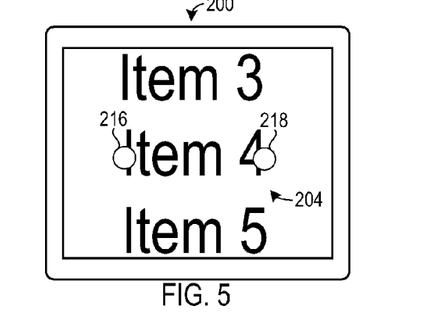
FIG. 5 illustrates an adjustment of a displayed range and zoom of the list of FIG. 2 in response to the second, multi-touch gesture illustrated in FIG. 4.

FIGS. 4 and 5 illustrate an embodiment of a second, multi-touch gesture that may be made over the scrollable list of items to change a displayed range of a list (i.e. a number of items in the list that are displayed at one time). This input and operation may be referred to herein as a "zoom input" or a "zoom operation" or the like. Referring first to FIG. 4, the second, multi-touch gesture may be performed by touching the display with first and second manipulators, 216 and 218 respectively, at locations over the list, and then moving the fingers or manipulators across the touch-sensitive display in directions 220, 222 that change a distance between the two manipulators. If a direction of a path 224 along which the change in distance occurs is within a predetermined range of directions, then the gesture may be interpreted as a zoom gesture, and a displayed range of the list may be modified such that fewer items are displayed, as illustrated in FIG. 5. In this way, a user may facilitate generation of a more detailed view of the list, enlarging rich content included in the list. While shown in the context of two manipulators, it will be appreciated that the second, multi-touch input may be performed with more than two touch inputs. For example, where three or more touches are used in a gesture, an average or maximum distance between the touches may be used to determine a direction of movement and a magnitude of change to apply to the range of content displayed in the list.

As described above, the first touch gesture and second, multi-touch gesture may be detected by determining whether a path of a gesture falls within predetermined ranges of directions. Any suitable ranges may be used. In some embodiments, the directions of the first touch gesture may be within a range that is transverse and non-overlapping compared to the range of directions of the second touch gesture. In one more specific embodiment in which the list is a one-dimensional list (i.e. scrollable along a single scroll axis, whether vertical, horizontal, or other), an angular range for the first touch gesture may extend forty five degrees to each side of a direction parallel to the scroll axis in both directions along the scroll axis. Likewise, an angular range for the second, multi-touch gesture may extend forty five degrees to each side of a direction perpendicular to the direction of the scroll axis. In this manner, the range of directions for the first touch gesture occupies two opposite quadrants of an "X" shape that each bisect the scroll axis (i.e. the direction along which scrolling occurs), while the range of directions for the second touch gesture occupies the other two quadrants of the "x" shape. In other embodiments, the ranges of directions for the first and second gestures may overlap, and may have any other suitable angular ranges. Further, in yet other embodiments, once a second, multi-touch zoom gesture has been detected and is in progress, a user may rotate the direction of the gesture to a direction outside of the range of directions used to detect the second, multi-touch gesture, and even to a direction parallel to the direction of scrolling, while continuing the gesture without disrupting the zooming operation.

As described above, the second, multi-touch gesture also may be configured to adjust a rate of scrolling relative to a rate of motion of a touch or touches used to perform the first touch gesture. For example, as shown in FIGS. 6-7, a two-finger version of the first touch gesture is illustrated as being performed on the zoomed list of FIG. 5. As shown in FIG. 7, the first touch gesture is shown to cause scrolling in which the ratio of the list scrolling rate to the gesture motion rate is greater than 1:1. In other embodiments, a zoom-in operation may cause a scrolling rate to decrease.

Figure 8:
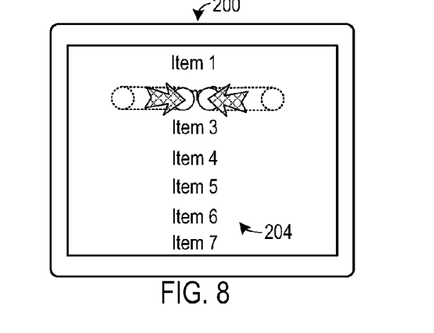
FIG. 8 illustrates embodiments of a first touch gesture and a second, multi-touch gesture being performed in a temporally overlapping manner over the list of FIG. 2.
Figure 9:
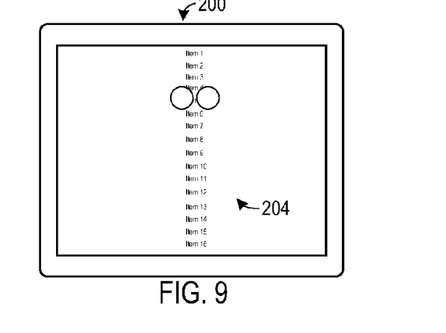
FIG. 9 illustrates a movement of the list and an adjustment of a displayed range of the list in response to the input illustrated in FIG. 8.

FIGS. 8-9 illustrate the use of a second, multi-touch gesture to increase a displayed range of a list, and also to zoom-out the appearance of items in the list. As illustrated, two touches are pinched together along a direction transverse to the scrolling direction of the list to perform the second, multi-touch gesture, thereby increasing the displayed range of the list (e.g. zooming out).

In some embodiments, a user may perform the first and second gestures in a temporally overlapping manner by, for example, moving two touches along a scrolling direction while also changing a distance between the touches. The use of temporally overlapping first and second gestures allows a user to both scroll through a list, and change a zoom and/or scroll rate of the list, in a combined gesture. Likewise, either gesture may also be performed separately from the other to perform desired manipulations of a list on a user interface. In either case, the depicted gestures are configured to correspond to the resulting manipulations of the list in an intuitive manner. In this manner, a user may quickly and easily learn to manipulate lists displayed on a graphical user interface.

Upon completion of a second, multi-touch gesture to zoom in or zoom out of a list view (i.e. after the fingers or other manipulators are lifted from the touch-sensitive display), the list either may revert automatically to a default value for the displayed range and/, or may remain in the new zoom state. For example, an automatic reversion (i.e. non-persistent zoom) may be used where it is desired to allow a user to temporarily magnify or reduce a size of a list for scrolling precision or speed. Likewise, a persistent zoom may be used where it is desired to allow a user to choose between different list views that contain different amounts of detail, different items of content, etc. Examples of lists that display different content at different views are described in more detail below. Further, in some embodiments, the displayed range of list items and/or scrolling rate may be changed in a continuously controllable manner in response to the second, multi-touch input, while in other embodiments, the displayed range of list items and/or scrolling rate may be adjusted in discrete steps.

Figure 10:
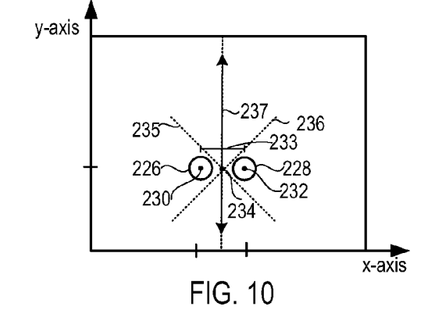
FIG. 10 illustrates an embodiment of a method of distinguishing a first touch gesture and a second touch gesture.
Figure 11:
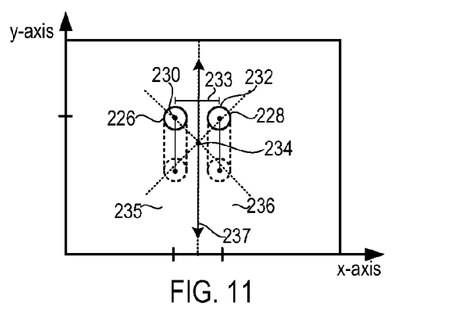
FIG. 11 illustrates a detection of a first touch gesture.
Figure 12:
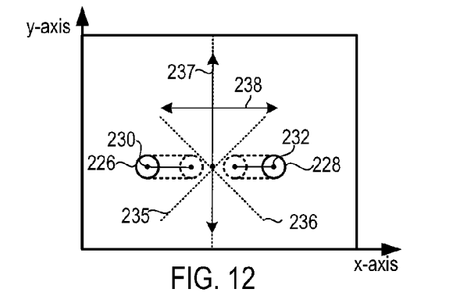
FIG. 12 illustrates a detection of a second, multi-touch gesture.

FIGS. 10-12 illustrate an example of a method that may be used to detect the first and second touch gestures. It will be appreciated that other suitable touch input and touch gesture detection techniques may be used in other embodiments. Referring first to FIG. 10, positions of a first touch input 226 and a second touch input 228 are mapped with x and y coordinates that correspond, for example, to average locations 230 and 232, respectively, of the areas occupied by the first touch input 226 and the second touch input 228. In other embodiments the coordinates of the touch input may correspond to other suitable positions within the area of each touch input. Next, a "center of mass" 234 (i.e. average location) of the detected touches is determined, and first and second axes 235 and 236 that bisect the center of mass 234 and are arranged transverse to a direction of a scrolling axis 237. Axes 235 and 236 define left, right, top and bottom angular quadrants located between the axes, with reference to the orientation of FIG. 10 and relative to the scrolling axis 237.

As illustrated in FIG. 11, a first touch gesture is detected if the path of the motion of the center of mass 234 is along a direction within the top and bottom quadrants between axes 235 and 236 relative to the scrolling axis 237. On the other hand, if the path of the motion of the center of mass 234 is along a direction within the left and right quadrants, then the motion is not determined to be a first touch gesture configured to cause scrolling, and no scrolling is performed in response. In the depicted embodiment, the motion of center of mass 234 is shown to be parallel to the direction of the scrolling axis 237, but it will be understood that any motion within the top and bottom quadrants displayed in FIGS. 10-11 will be interpreted as a scrolling input. While the depicted embodiment shows axes 235 and 236 as being angled approximately 45 degrees from the scrolling direction, it will be understood that they may have any other suitable angle relative to the scrolling direction. Further, while depicted in the context of a two-touch gesture, it will be understood that a first touch gesture configured to cause scrolling of a list may be performed with any suitable number of touch inputs, whether a single touch input, or more than two touch inputs.

Next referring to FIG. 12, a second, multi-touch gesture 214 configured to change a displayed range of the list is detected if multiple touches are depicted, and a distance between the touch inputs 226 and 228 changes along a direction within the left and the right quadrants defined by axes 235 and 236. In FIG. 12, the direction along which the distance between the touch inputs 226 and 228 changes, shown at 238, is within the left and right quadrants defined by axes 235 and 236. Therefore, this change in distance is determined to be a second, multi-touch input, and the displayed range of the list is adjusted accordingly.

Figure 13:
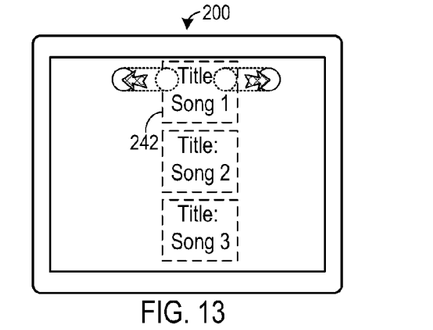
FIG. 13 illustrates an embodiment of a second, multi-touch gesture being performed over an embodiment of a list of items in which each item includes a text field.
Figure 14:
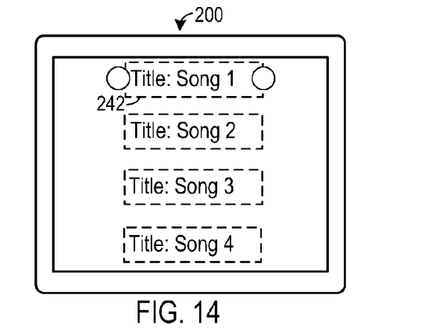
FIG. 14 illustrates an adjustment of the text fields of the list of FIG. 13 in response to second, multi-touch gesture of in FIG. 13.

The displayed range of a list may be changed in any suitable manner in response to a zoom input. Referring briefly back to FIGS. 4 and 5, in some embodiments, the items in the list may be scaled in size in response to the second, multi-touch gesture. In other embodiments, as shown in FIGS. 13 and 14, the items may be rearranged within the list to fit within the new dimensions of the list, without themselves being scaled correspondingly. As can be seen in FIGS. 13 and 14, when a width of the list changes in response to a zoom operation, each text item in the list is rearranged to fit within the field. It will be appreciated that a zoom operation may cause the size of the list fields to be adjusted either in height, width, or both height and width.

Figure 15:
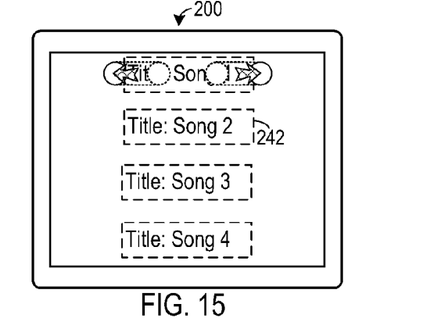
FIG. 15 illustrates an embodiment of a second, multi-touch gesture being performed over an embodiment of a list of items in which each item has multiple fields.
Figure 16:
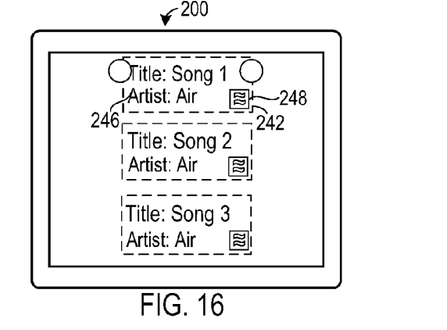
FIG. 16 illustrates an adjustment of the fields of the list of FIG. 15 to the second, multi-touch gesture of in FIG. 15.

In some embodiments, rearranging the item in a list in response to a second, multi-touch input may include re-populating or de-populating an item with different fields or elements. For example, an item in the list may include various elements, such as icons, text such as metadata, images, etc., depending upon the scale at which the item in the list is shown. Where the item is shown in at a relatively closer zoom, each list item may contain more populated elements, whereas fewer elements may be used at relatively farther zooms. FIGS. 15 and 16 illustrate one example of an embodiment in which list items are populated or depopulated depending upon a zoom at which the list item is shown. As depicted, a second, multi-touch gesture in which first and second touches are spread apart is used to expand list item 242 such that list item 242 is re-populated with additional text 246, such as metadata regarding the list item, as well as an icon 248. Likewise, an inverse gesture in which first and second touches are brought together may be used to depopulate the list items. In this way, list item content may be revealed or hidden as desired through the use of the second, multi-touch gesture.

Figure 17:
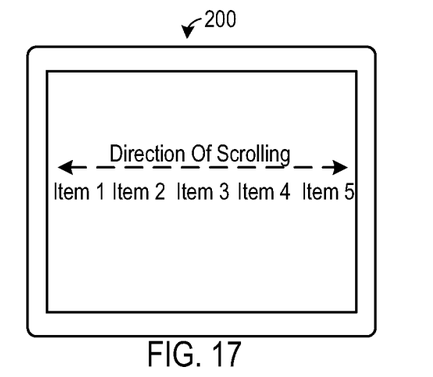
FIG. 17 illustrates an embodiment of a horizontally scrollable list.

In the embodiments discussed above, each depicted list is shown as being scrollable in a vertical direction. However, it will be understood that the concepts disclosed herein also may be used with horizontally scrolled lists, an embodiment of which is shown in FIG. 17, or with any other suitable scrollable list.

Figure 18:
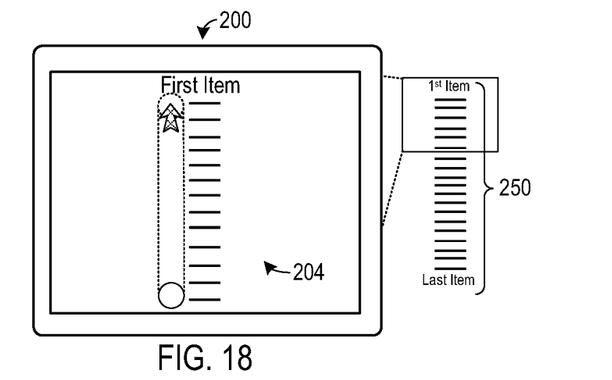
FIGS. 18 and 19 illustrate an embodiment of a first touch gesture performed on a list to increase a relative scrolling rate of the list.
Figure 19:
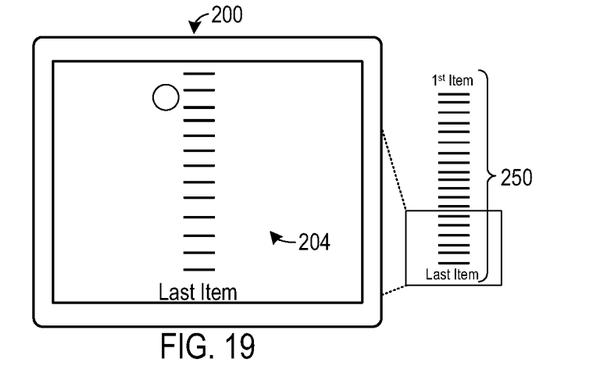

Referring briefly to the discussion above, FIGS. 2 and 3 show the first gesture being used to scroll a list with a 1:1 correspondence in gesture movement compared to list movement. FIGS. 18 and 19 illustrate an example of non-1:1 scrolling that may be used in some embodiments to allow a user to quickly browse through a long list with a single gesture. As described above, a user may perform a second, multi-touch gesture in which a first touch and a second touch are brought together to increase a displayed range of a list. Upon performing such a gesture, in some embodiments, a user may then be able to scroll through an entire list, represented schematically at 250 in FIGS. 18 and 19, by moving a single touch from a first side of the user interface window to an opposite side of the user interface window. In various embodiments, the distance that the first touch gesture is moved to cause scrolling through an entirety of a list may either be less than or equal to a vertical or horizontal length of the user interface window, depending upon any acceleration parameters applied in response to the gesture. It will be understood that this capability may be utilized in embodiments where scrolling occurs along the same direction as the gesture and in embodiments where scrolling occurs in an opposite direction to the gesture.

In some embodiments, a user interface may be configured to react to a first touch gesture with inertial scrolling characteristics. For example, if a user performs a first touch gesture at relatively high rate of gesture speed, and/or accelerates motion throughout a gesture, a scrollable list of items may continue scrolling in an inertial manner even after completion of the first touch gesture. The inertial characteristics displayed in response to a gesture may be dependent upon various factors, including but not limited to a size of a list, a speed/acceleration/length of the gesture, characteristics of an application used to display the list, etc.

Figure 20:
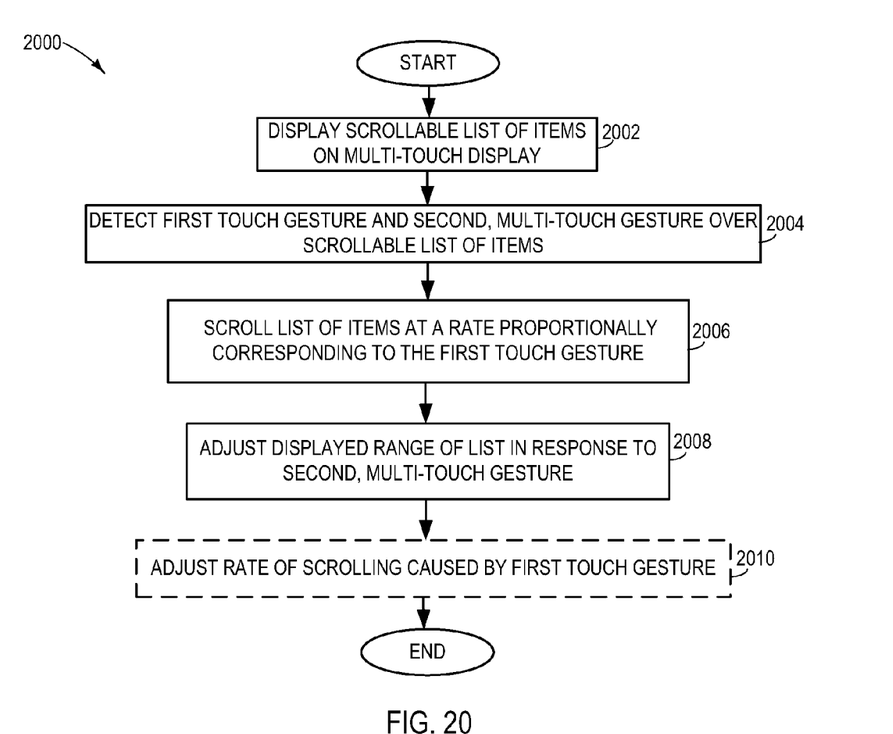
FIG. 20 shows a process flow depicting a method of detecting and responding to touch gestures on a touch-sensitive display.

FIG. 20 shows an embodiment of a method 2000 for controlling a computing device having a touch-sensitive display. Method 2000 comprises, at 2002, displaying a scrollable list of items on the touch-sensitive display, and, at 2004, detecting a first touch gesture and a second, multi-touch gesture over the scrollable list of items. The gestures may or may not be detected at overlapping time intervals. In some embodiments, the motion of the first touch gesture may be along a direction of the scrolling, while the motion of the second, multi-touch gesture may be transverse to the direction of scrolling, as shown in FIG. 12 and discussed above. In other embodiments, the first touch gesture may be along a path within a first range of directions, while the second touch gesture may be along a path within a second range of directions.

Continuing with FIG. 20, method 2000 next comprises, at 2006, scrolling the scrollable list of items, at a rate proportional to a rate of movement of the first touch gesture, and, at 2008, adjusting a displayed range of the scrollable list of items displayed on the touch-sensitive display in response to the second, multi-touch gesture. In some embodiments, as shown at 2010, the method may comprise adjusting a rate of scrolling caused by the first touch gesture in response to the second, multi-touch gesture.

Utilizing the above-described embodiments, a user of a multi-touch user interface may seamlessly navigate through longer lists by increasing a displayed range of list items without performing multiple, repetitive gestures. Further, a user may transition easily between more detailed and less detailed views of basic list items via smooth, intuitive gestures. The above-described embodiments further allow a user to efficiently utilize touches on a touch-sensitive display to perform multiple input functions during each contact instance. It will be understood that the term "computing device" as used herein may refer to any suitable type of computing device configured to execute programs. Such computing device may include, but are not limited to, a mainframe computer, personal computer, laptop computer, portable data assistant (PDA), computer-enabled wireless telephone, networked computing device, combinations of two or more thereof, etc. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that a computer-readable storage medium may be provided having program instructions stored thereon, which upon execution by a computing device, cause the computing device to execute the methods described above and cause operation of the systems described above.

It will further be understood that the embodiments of touch-sensitive displays depicted herein are shown for the purpose of example, and that other embodiments are not so limited. Furthermore, the specific routines or methods described herein may represent one or more of any number of processing strategies such as event-driven, interrupt-driven, multi-tasking, multi-threading, and the like. As such, various acts illustrated may be performed in the sequence illustrated, in parallel, or in some cases omitted. Likewise, the order of any of the above-described processes is not necessarily required to achieve the features and/or results of the exemplary embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of operating a computing device, the computing device comprising a touch-sensitive display, the method comprising:
    displaying a scrollable list of items on the touch-sensitive display, the scrollable list of items including a plurality of simultaneously displayed items, each item including a plurality of elements of which a portion are displayed;
    detecting a first touch gesture over the scrollable list of items on the touch-sensitive display, and in response to detecting the first touch gesture over the scrollable list of items, scrolling the scrollable list of items on the touch-sensitive display by changing a position of each of the plurality of simultaneously displayed items; and
    detecting a second, multi-touch gesture over the scrollable list of items on the touch-sensitive display, and in response to detecting the second, multi-touch gesture over the scrollable list of items, displaying additional elements for each item,
    wherein the second, multi-touch gesture comprises a change in distance between two or more touch inputs.

2. The method of claim 1, further comprising scrolling the scrollable list of items on the touch-sensitive display by changing a position of each of the plurality of simultaneously displayed items in a direction of scrolling based on a component of the first touch gesture being along a same direction as the direction of scrolling.

3. The method of claim 2, further comprising scrolling the scrollable list of items in proportion to the component of the first touch gesture along the same direction as the direction of scrolling.

4. The method of claim 2, further comprising performing the first touch gesture and second, multi-touch gesture in a temporally overlapping manner by changing the component of the first touch gesture along the direction of scrolling while also changing the distance between the two or more touch inputs.

5. The method of claim 4, further comprising adjusting a rate of scrolling caused by the first touch gesture in response to the second, multi-touch gesture.

6. The method of claim 5, wherein the rate of scrolling caused by the first touch gesture is increased in response to a zoom out operation, and the rate of scrolling is decreased in response to a zoom in operation.

7. The method of claim 1, further comprising scrolling the scrollable list of items in an inertial manner after completion of the first touch gesture.

8. The method of claim 1, wherein the first touch gesture comprises two or more inputs.

9. The method of claim 1, further including displaying the scrollable list of items on the touch-sensitive display while omitting display of a scroll bar associated with the scrollable list of items.

10. A computing device, comprising:
    a touch-sensitive display;
    a processor; and
    memory comprising code stored therein that is executable by the processor to:
        display a scrollable list of items on the touch-sensitive display, the scrollable list of items including a plurality of simultaneously displayed items spaced apart from one another, each item including a plurality of elements;
        detect a first touch gesture over the scrollable list of items on the touch-sensitive display, and in response to detecting the first touch gesture over the scrollable list of items, scroll the scrollable list of items by changing a position of each of the plurality of simultaneously displayed items; and
        detect a second, multi-touch gesture over the scrollable list of items on the touch-sensitive display, and in response to detecting the second, multi-touch gesture over the scrollable list of items, rearrange a plurality of elements displayed for each item,
        wherein the second, multi-touch gesture comprises a change in distance between two or more touch inputs.

11. The computing device of claim 10, wherein the computing device is configured to scroll the scrollable list of items on the touch-sensitive display in a direction of scrolling based on a component of the first touch gesture being along a same direction as the direction of scrolling.

12. The computing device of claim 10, further including code executable to adjust the displayed range of the scrollable list of items based on the second, multi-touch gesture by changing a distance between the two or more touch inputs.

13. The computing device of claim 10, wherein the instructions are executable to detect the first touch gesture and the second, multi-touch gesture when performed in a temporally overlapping manner, and to adjust a rate of scrolling caused by the first touch gesture in response to the second, multi-touch gesture.

14. The computing device of claim 10, wherein the computing device is configured to scroll the scrollable list of items in an inertial manner after completion of the first touch gesture.

15. A computing device, comprising:
a touch-sensitive display;
a processor; and
memory comprising code stored thereon executable by the processor to:
  display a scrollable list of items in a graphical user interface on the touch-sensitive display, the scrollable list of items including a plurality of simultaneously displayed items, the simultaneously displayed items spaced apart from one another and each item of the scrollable list of items including a plurality of elements of which a portion are displayed;
  detect a first touch gesture over the scrollable list of items on the touch-sensitive display in the graphical user interface, and in response to detecting the first touch gesture over the scrollable list of items, scroll the scrollable list of items in the graphical user interface on the touch-sensitive display by changing a position of each of the plurality of simultaneously displayed items in the graphical user interface, the first touch gesture comprising a single touch moved over the scrollable list of items; and
  detect a second, multi-touch gesture over the scrollable list of items on the touch-sensitive display, and in response to detecting the second, multi-touch gesture over the scrollable list of items, display additional elements for each item,
  wherein the second, multi-touch gesture comprises a change in distance between two or more touch inputs.

16. The computing device of claim 15, wherein the code comprises instructions executable to detect a motion of the first touch gesture on the touch-sensitive display in the graphical user interface along a path within a first range of directions in a scrolling direction, and a motion of the second, multi-touch gesture in a second range of directions transverse to the scrolling direction.

17. The computing device of claim 16, wherein the code further comprises instructions executable to detect a first range of directions and a second range of directions that overlap, and to detect a motion of one or more touch inputs that extend outside of a range of directions.

18. The computing device of claim 17, wherein the code comprises instructions executable to detect a first touch gesture and a second, multi-touch gesture performed in a temporally overlapping manner, and the computing device is configured to adjust a rate of scrolling caused by the first touch gesture in response to the second, multi-touch gesture.

19. The computing device of claim 15, wherein the code comprises instructions executable to revert the displayed range of the scrollable list of items in the graphical user interface to a default value upon completion of the second, multi-touch gesture.

* * * * *